Dec. 18, 1951 C. W. HANSELL 2,579,070

MULTIPLEX COMMUNICATION SYSTEM

Filed Feb. 14, 1945 3 Sheets-Sheet 1

INVENTOR.
CLARENCE W. HANSELL
BY H. S. Grover
ATTORNEY

Dec. 18, 1951 C. W. HANSELL 2,579,070

MULTIPLEX COMMUNICATION SYSTEM

Filed Feb. 14, 1945 3 Sheets-Sheet 2

INVENTOR.
CLARENCE W. HANSELL
BY H. S. Grover
ATTORNEY

MULTIPLEX COMMUNICATION SYSTEM

Filed Feb. 14, 1945

INVENTOR.
CLARENCE W. HANSELL
BY
H. S. Grover
ATTORNEY

Patented Dec. 18, 1951

2,579,070

UNITED STATES PATENT OFFICE 2,579,070

MULTIPLEX COMMUNICATION SYSTEM

Clarence W. Hansell, Port Jefferson, N. Y., assignor to Radio Corporation of America, a corporation of Delaware Application February 14, 1945, Serial No. 577,791

14 Claims. (Cl. 250—9)

Figure 1:
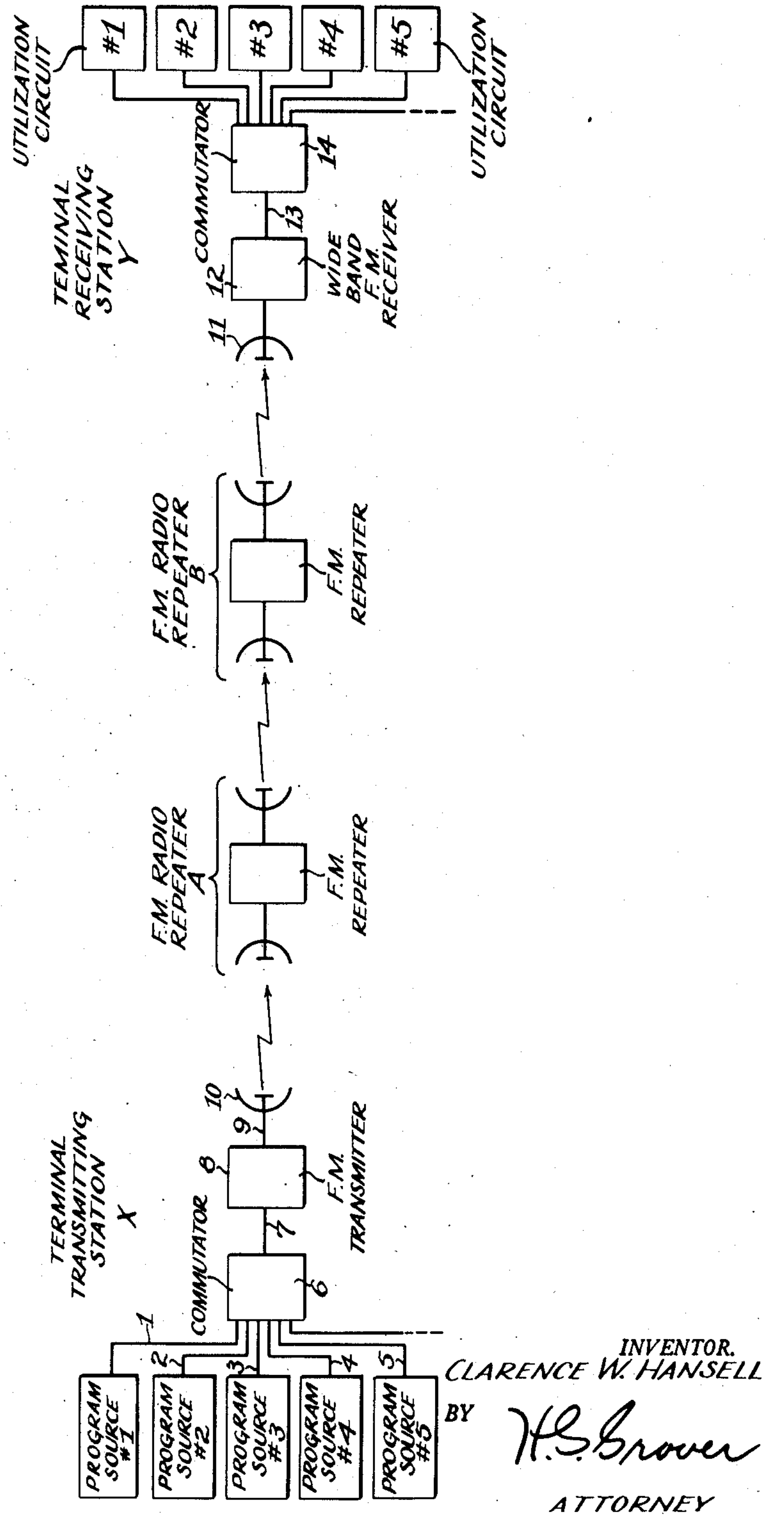

The present invention relates to a frequency modulation multiplex communication system.

Among the objects of the present invention are: To provide a frequency modulation multiplex system particularly designed to operate through communications circuits which have been designed primarily to satisfy television requirements; to provide a wide band frequency modulation multiplex system especially useful for radio relaying purposes wherein there is obtained a reduction in cross channel interference; and to provide a new type of frequency modulation multiplex system operating on the time division principle.

Heretofore, in utilizing multi-channel frequency band division systems, it has been customary to transmit over a system at the same time a plurality of different signals covering different frequency bands. All channels operate simultaneously and frequency discrimination is relied upon to separate the channels. In such known systems, the difference in time of travel of currents of all frequencies in each of the channels from one end of each channel band to the other is small, and for this reason the time delay over the cable between different frequencies is of negligible concern, although the difference in time delay between the highest and lowest frequencies of all of the combined channels, in passing over the system, may be relatively large. It is important, however, in such systems to eliminate distortions due to non-linearity of modulators, amplifiers and other circuits. Any lack of perfection or non-linearity of modulation response in these known systems will cause energy in every channel to produce some interference in every other channel. To prevent substantial interference requires an extreme degree of linearity or perfection in the modulation response of the system, particularly if the system is one requiring repeaters or relays each of which may contribute to distortion or imperfection in overall response of the system to modulation.

A communications system such as usually will be used to practice the present invention, however, may have relatively large amplitude distortions, such as may be due to the non-linear characteristics of the different circuits (comprising the modulation frequency amplifiers, the radio frequency amplifiers, the modulator, and the demodulator) because these amplitude distortions are relatively inconsequential in practicing the invention. In a system designed primarily to meet television requirements, the important operating characteristics are reversed in order of relative importance, or emphasized differently, from those of the known systems described above. In the television system, certain performance characteristics range in the following order of importance: (1) Uniform time delay for all modulating waves, (2) uniform amplitude response to currents of all modulating frequencies, and (3) uniform or linear relative amplitude response to all instantaneous modulating potentials. As an overall effect, the invention makes it possible to bring about a large reduction in interference between communications channels multiplexed upon a wide band system, in exchange for some loss in percentage untilization of the total frequency band occupied by the frequency modulated carrier current. When not in use for television, the system of the invention may then be used successfully for handling facsimile messages, telephone, telegraphy, and signals for the operation of business machines, etc.

Broadly stated, the present frequency modulation multiplex system employs a commutator arrangement to connect a circuit to one after another of a number of sources of modulation, with the process repeating at a rate substantially greater than the highest modulation frequency of each channel. Successive time periods within each rotation of the commutator will then be characterized by a potential in the output circuit of the commutator which is representative of the instantaneous modulation potentials in successively coupled sources of modulation. The resulting variable potential in the commutator output circuit is then utilized to frequency modulate a carrier current which is transmitted over a radio or cable circuit which may include any number of repeaters, to a receiving station where the received carrier current is demodulated to reproduce the wave form of the modulating current which was applied to the original frequency modulated carrier current. Another commutator at the receiver operated in synchronism with the commutator at the transmitter, then separates the received current according to time periods assigned to the several sources of modulation and delivers to a succession of individual output circuits pulses representative of the current amplitude corresponding to and following the modulating currents of the several sources of modulation at the transmitter. These individual output circuits may themselves comprise sound broadcasting transmitters associated with television stations. It will thus be seen that the several channels of communication each may occupy the whole system frequency band but the several channels will share time instead of sharing frequency band, in passing over the system between terminal stations.

The present invention has outstanding advantages not only in respect to cost, weight and complexity of channeling equipment but also in respect to interference between channels. In a properly designed system of the present invention, interference is confined, for all practical purposes, to energy from one channel left over during the time period assigned to the next successive channel in the channeling arrangement and in practice even this residual energy may be very largely balanced out, or have its effect balanced out, by suitable time delay and adjustable coupling arrangements.

The use of the time sharing feature in the frequency modulation system of the invention brings about a large reduction in intereference between channels at the expense of some loss in percentage utilization of the total frequency band occupied by the frequency modulated carrier current. This exchange of efficiency of band width utilization for a reduction in cross channel interference, by means of time division multiplexing is analogous to a similar result obtainable when a carrier current is modulated by a series of frequency spaced frequency modulated sub-carrier currents. In this latter case it is possible, by reducing the number of channels carried by subcarrier currents, to employ a larger degree of frequency modulation in each channel. This larger degree of frequency modulation then brings about a reduction in the relative effects of inter-channel interference as compared with the effect of the useful modulation in each channel.

Figure 2A:
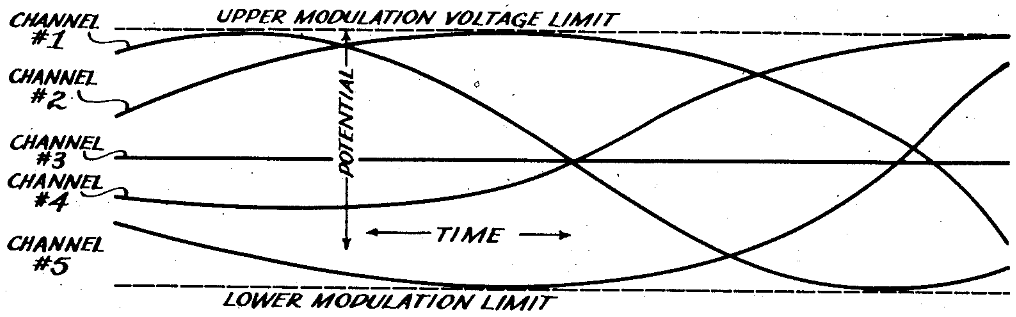
Figure 2B:
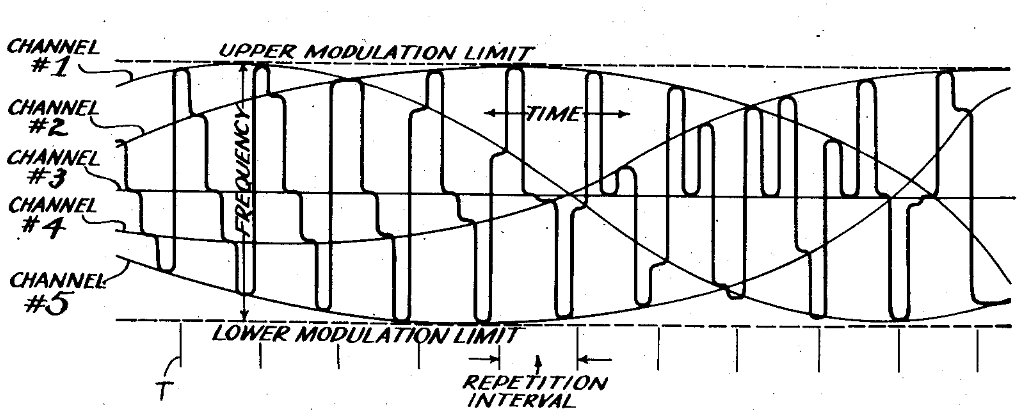

A more detailed description of the invention follows in conjunction with a drawing, wherein:

Fig. 1 diagrammatically illustrates one embodiment of the invention as applied to a frequency modulation radio relaying system;

Fig. 2*a* shows the individual modulating potentials which may be delivered from the different channel sources at the transmitter to the commutator unit 6 of Fig. 1;

Fig. 2*b* shows the wave form in the output of the commutator which is applied to the frequency modulation transmitter, when the input to the commutator is as illustrated in Fig. 2*a*; and Figs. 3*a*, 3*b*, 3*c* and 3*d* show alternative arrangements for balancing out interference or cross talk from one time division communications channel into another channel occupying successive time periods.

Referring to Fig. 1 in more detail, there is shown a frequency modulation communication system especially suitable for radio relaying purposes, particularly for the relaying of television signals. This system includes a terminal transmitting station X and a terminal receiving station Y which are joined by a plurality of intermediate radio repeater stations, of which only two have been shown by way of example, identified as A and B. At the terminal transmitting station there are provided a plurality of sources of modulation (numbers 1 to 5, etc.) coupled by way of leads 1, 2, 3, 4 and 5, etc., to the vacuum tube commutator 6.

This vacuum tube commutator can be any one of a number of known types of commutators, such, for example, as the commutator described in application Serial No. 543,144, now Patent No. 2,420,374, granted May 13, 1947, filed by W. D. Houghton on July 1, 1944, or one employing a circular sweep cathode ray tube having multiple electrodes for utilizing the electron stream in succession for the various channels. The output of the commutator appearing in connection 7 comprises a complex wave form modulation potential and current representative of the modulation potentials in all of the channels 1 to 5, etc. The individual modulating potentials appearing in leads 1 to 5 may take the form of the graphical representations of Fig. 2*a*. The commutator 6 sequentially connects each of the modulating sources in turn to the single circuit lead 7, extending to the frequency modulation transmitter 8. The time intervals assigned to the different modulating input sources 1 to 5 by the commutator 6 are of equal duration, and the time periods assigned to each channel is repeated at a rate which is on the order of two to three times the highest modulating frequency. Thus, if the sources 1, 2, 3, 4 and 5 are entertainment sound program sources designed for modulating frequencies from each source ranging up to 15,000 cycles, a minimum repetition rate of the commutator 6 in assigning each of these program sources to the frequency modulation transmitter may be approximately $2.5 \times 15{,}000 = 37{,}500$ per second. In any case it should be no less than twice the highest modulation frequency. The resulting wave form of modulation input to the frequency transmitter 8 from the commutator 6, as it appears in lead 7, is shown in Fig. 2*b*. In this resulting wave form, the potential, during time periods assigned to any one channel, is proportional to the instantaneous modulating potential for that one channel. From an inspection of Fig. 2*b*, it will be seen that the complex wave form modulation in lead 7 varies from time to time in dependence upon the individual modulating potentials which are delivered to the commutator from the different program sources.

The frequency modulation transmitter 8 may, for example, comprise any suitable type of frequency modulation transmitter capable of producing a carrier current frequency anywhere in the range from 300 to 30,000 megacycles, preferably above 1,000 megacycles, which provides a wide band output. For example, transmitter 8 can comprise an oscillator which is coupled to a reactance tube modulator and which is followed by a suitable amplifier, or it may comprise a reflex type of self-oscillating tube employing electron stream velocity modulation with electron bunching, or a magnetron whose voltages are modulated to vary the electron transit time. No claim is made to the frequency modulation transmitter per se, since any one of several well known types can be employed. By way of example, the frequency modulation transmitter 8 may supply an output having $\pm 5$ megacycles peak frequency modulation, or 10 megacycles total swing with the side bands reaching out further 5 megacycles on either side of the 10 megacycles, making a total of 20 megacycles. The output from the transmitter 8 is supplied to a transmission line or wave guide 9 extending to a suitable directive antenna 10, here shown by way of example as a dipole antenna at or near the focus of a parabolic reflector.

Intermediate the terminal transmitting station X and the terminal receiving station Y are a plurality of repeater stations A and B which are representative of any number of these repeater stations. Where the radio relaying system is one of great length, such as is required to traverse a continent, there may be as many as 200 or more of these spaced repeaters, each one comprising a directive input antenna positioned to receive signals from one station, a directive output antenna positioned to transmit or relay the signals to the next succeeding repeater, and amplitude limited frequency modulation repeater apparatus located between the incoming and outgoing directive antennas. It is preferred that the directional antennas at the repeater stations and also at the terminal stations be elevated to increase the range of each relay station, with a consequent use of a most economical number of repeaters. The repeaters A and B should be of the frequency modulation type suitable for television purposes, and by way of example may be of the type mentioned in the paper entitled "Radio Relaying Systems Developed by the Radio Corporation of America," with accompanying references cited therein, given by me before the National Electronics Conference in Chicago on October 5, 1944, and published in the Proceedings of the I. R. E., vol. 33, No. 3, March 1945.

The terminal receiving station Y comprises a directive antenna 11, which is coupled to a wide band frequency modulation receiver 12, in turn coupled by way of lead 13 to a vacuum tube commutator 14. The frequency modulation receiver 12 should be capable of passing up to the final detector, or receiving the frequency band up to the 20 megacycles put out by the transmitter X, in order to obtain maximum initial suppression of cross channel interference, although fairly satisfactory results may be obtained with less band width at the receiver down to about 10 megacycles (depending upon the tolerable amount of cross-channel interference and the apparatus used to neutralize this interference). The vacuum tube commutator 14 at station Y is similar to the vacuum tube commutator 6 at station X and both commutators are synchronized to operate at the same repetition rate. The output from the commutator 14 at station Y is sequentially passed on to a plurality of utilization circuits 1—5, etc., corresponding in number to the program sources at the transmitting station X. These utilization circuits may be sound broadcasting transmitters associated with television broadcast stations, as a result of which the programs emanating from the remote transmitting station X can be rebroadcast at the receiving station Y.

Apparatus is used, preferably at the receiver, for balancing out residual interference in the different channels. This is done in a manner generally described in my Patent 2,310,692, granted February 9, 1943, which involves delaying some of the energy of a signal pulse and reintroducing a portion thereof with reversed polarity at a time such as to balance out the effects of undesired residual signal pulse energy in time periods assigned to another channel.

In general it may be said that there is a tendency for the selective circuits of the receiver 12 of Fig. 1 to retain the potential conditions established in time periods assigned to one time division channel over into the next succeeding time periods occupied by the next channel, in order of time sequence of the commutators. This residual or hang-over effect is characteristic of all frequency selective circuits and is characterized by a time lag and time spreading of input potential pulses as they pass through the circuits, the amount of the time spreading being determined by the frequency selectivity and being greater the greater the selectivity.

In practice, the time spreading of the effect of signal pulses in each channel is not confined to the receiver circuits but also may take place in the transmitter and repeater circuits and in cable or radio circuits between repeaters. In practice, however, the selective circuits of the final receiver are likely to be the predominant contributor to the time spreading because, in accordance with the teachings of my patent application Serial No. 583,239, filed March 17, 1945, now Patent No. 2,467,308, granted April 12, 1949, I would expect to use relatively great selectivity in the receiver ahead of the final detector or demodulator and then to correct for this excess selectivity in the circuits following the demodulator. In practice, to also correct for selectivity elsewhere in the system, and for multipath effects, I would expect to so adjust the correction circuits following the demodulator as to correct for nearly all lapping over of energy from time periods of each channel into time periods of successive channels.

Because there are numerous possible detail arrangements for reducing the cross channel interference, only a few of the arrangements will be described herein. In general, all of them will be found to function by storage of energy in time periods and release of energy in later time periods with polarity such as to balance out the effect of undesired energy in the later time periods.

Figure 3A:
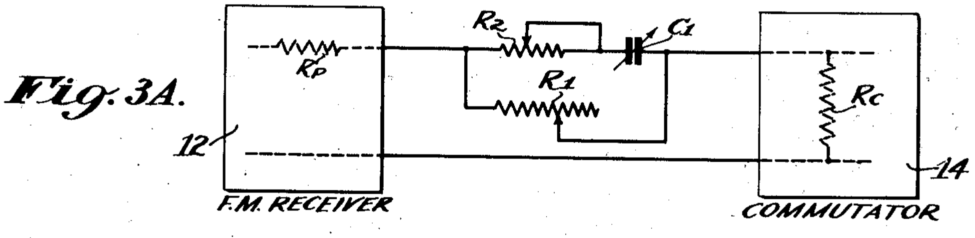

A simple arrangement for balancing out energy from one time period remaining over in a succeeding time period is shown in Fig. 3A. In the operation of the system of Fig. 3A, rectified pulse energy from the output of receiver 12 is passed through a condenser-resistance network on its way to commutator 14. The condenser-resistance C1, R1, R2 network is assumed to have been inserted i nthe connection labeled 13 in Fig. 1. The output of the receiver, in the form of more or less rectangular pulses which are signal modulated in amplitude, are partly delivered to the commutator 14, partly stored in condenser C1, and partly dissipated in resistances R1 and R2.

At the end of each channel pulse period there is left stored in condenser C1 an amount of charge representative of the pulse amplitude during the pulse period. This charge is dissipated in the succeeding time period, or is added to or subtracted from energy placed in the condenser during the succeeding time period, in such a way as to produce in the input of commutator 14 a component of potential which is reversed in polarity as compared with the polarity during the earlier period when the charge was stored. As a consequence, pulse potential in one time period results in an adjustable lower potential of reversed polarity in the next succeeding time period. Then, if due to causes in the receiver or other parts of the system, energy present in one time period is partially spread out into the next succeeding time period, the reversed polarity energy from condenser C1 can be made to balance out the effect to prevent cross talk from one time channel into a successive time channel. By adjusting the values of the condenser C1 and the resistances R1, R2, a minimum value of cross-talk interference can be obtained.

Figure 3B:
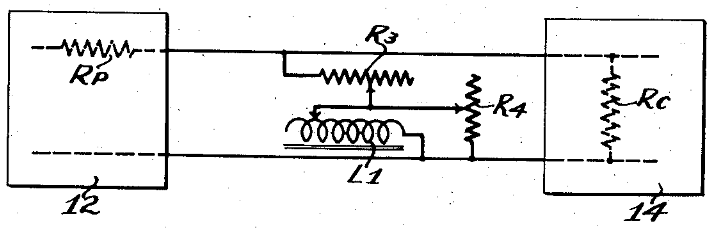

Fig. 3B shows a circuit for accomplishing the same result as achieved in Fig. 3A by storing energy in an inductance L1 during one time period to provide a reversed polarity potential in a succeeding period for balancing cross-talk. It should be noted that portions of resistors R3 and R4 are in series across the two sides of the line.

Figure 3C:
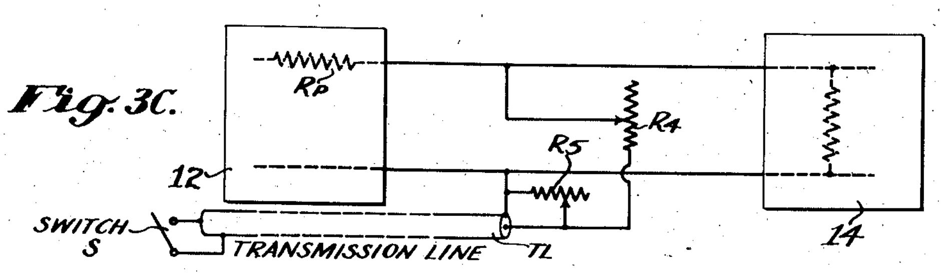

Fig. 3C shows an alternative arrangement in which a section of transmission line TL is used which has a length such that waves impressed on one end of the line travel to the other end and are reflected back to arrive at a time to balance out undesired cross-talk energy. At the end of the line where reflection takes place, the polarity of the reflected wave may be reversed by opening the switch S, shown there. Thus, by closing or opening the switch, either polarity of reflected wave may be returned to the commutator input circuit, depending upon which polarity may be needed to obtain a cross-talk balance.

Figure 3D:
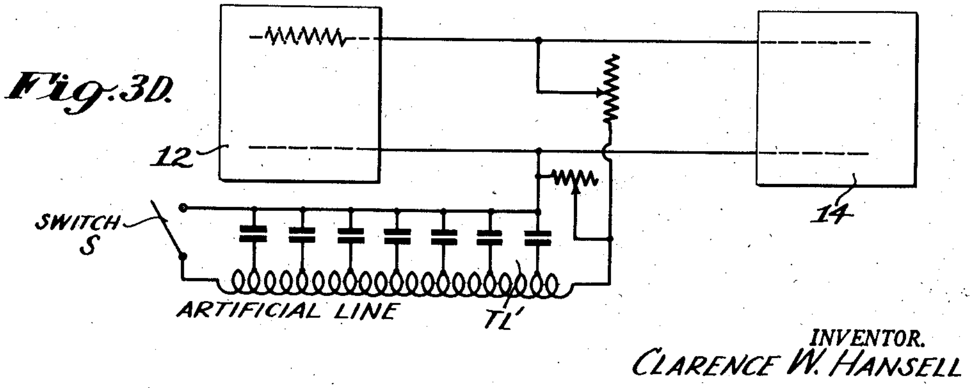

In Fig. 3D the transmission line TL of Fig. 3C is shown replaced by an artificial or simulated line TL′ made up of coils and condensers. This substitution may save bulk and weight in some cases.

Further details relating to design and adjustment of the circuits of Fig. 3C and Fig. 3D have been given in my Patent 2,310,692, previously referred to. The balancing problem is nearly the same whether the undesired spreading of energy is due to circuit selectivity or multipath phenomenon.

In general it may be said that to a crude degree of approximation the balancing circuits tend to widen or flatten the overall frequency response characteristic of the communication system, which is, of course, a corollary to preventing time spreading of the signal energy.

Let us assume that the frequency modulation transmitter requires the transmission of modulating frequencies up to 15,000 cycles. In the time sharing or time division multiplex system of the invention when used for telephony, experience indicates that the time periods assigned to each channel should be repeated at a minimum rate which is about 2.5 times the highest modulating frequency, in which case the minimum repetition rate might be taken to be 2.5 times 15,000 or 37,500 cycles, if modulation frequencies up to 15,000 cycles are considered to be really important. It is believed that a repetitive rate of 40,000 per second is preferable and will prove to be adequate. If interference between adjacent channels is to be made small before the feature is added of balancing of residual interference by delaying a small amount of pulse energy and reintroducing a portion with reversed potential and current polarity, it may be assumed that response of the system up to the circuit 13, containing pulse samples of all of the channels, must be rapid enough to correspond to the reproduction of pulse modulation frequency components up to five times the commutator repetition rate multiplied by the number of channels, which for program transmission as assumed is $5\times 40{,}000N=200{,}000N$, where N is the number of channels.

In the television relay system of the present invention having a band width of five megacycles, it is possible for the condition assumed above to accommodate 25 sound program channels from the relation $N=5{,}000{,}000\div 200{,}000=25$. By means of cross-modulation balancing of energy from a time interval assigned to one channel overlapping into the next succeeding time interval assigned to another channel, it may be possible in practice to operate with a much larger number of channels. It may be noted that the theoretical maximum number of channels which might be accommodated in a five megacycle band is $5{,}000{,}000\div 30{,}000=166$ channels. Therefore, 25 channels will provide about 15% utilization of the channel space. This is about twice the percentage utilization of frequency band width in any community provided by the present American Standard System of Frequency Modulation (F-M) broadcasting. In the standard frequency modulation broadcasting system, the highest modulation frequencies are 15,000 cycles, which would require a minimum band of 30,000 cycles per transmitter; but, in practice, to accommodate wide band frequency modulation and to prevent interference the transmitters in any one community have carrier current frequencies spaced 400,000 cycles apart. It is equal to that which would be obtained with wide swing frequency modulated sub-carriers applied to a similar assignment of channels in a radio relay system employing sufficient frequency band division multiplex system to reduce interchannel interference by that method.

It will thus be seen that the present invention provides a means for reducing interference between channels in a frequency modulation multiplex system by sacrificing percentage utilization of the frequency band. By using this principle in this particular way, it becomes possible to utilize a television relay system whose characteristics cannot (for technical and economic reasons) be the best for multiplexing by frequency band division methods, for handling multiplex service when it is not required for television.

It should be noted that in the system of the invention not only is there a reduction in interchannel interference, but also there is a reduction of all other kinds of noise brought about by the very wide swing of the radio frequency carrier wave. If the carrier wave should be modulated with a frequency swing of plus and minus 5 megacycles by a single channel using the whole time, such as is done in conventional frequency modulation systems, the wide band gain in signal to noise radio would be $5{,}000{,}000\div 15{,}000=333$ to 1 in amplitude, or 11,100 to 1 in power, or 40.5 decibels approximately. When the time is divided between N channels, then theoretically the wide band power gain is reduced to $11{,}100\div N$.

What is claimed is:

1. A frequency modulation time division multiplex communication system comprising a plurality of channels each having impressed thereon signal potentials which fluctuate through a continuous range of amplitude values, a commutator for assigning said channels sequentially and periodically to a single circuit to thereby combine portions of the signals from the different channels into a single composite signal, the time periods assigned to each channel by the commutator being repeated at a rate which is higher than highest modulating frequency in the channel, and a wide band frequency modulation transmitter coupled to said single circuit and being frequency modulated by the composite signal in such manner that the transmitted frequency during the time period assigned to each channel is varied through a continuous range of values in proportion to the value of potential in the channel and through a frequency swing of at least plus and minus one megacycle.

2. A frequency modulation time division multiplex communication system comprising a plurality of channels each having signal modulation potentials of a continuous range of amplitude values impressed thereon, an electron discharge device commutator for assigning said channels sequentially and periodically to a single circuit to thereby combine portions of the signals from the different channels into a single composite signal having a substantially continuous range of amplitudes, the time periods assigned to each channel by the commutator being repeated at a rate which is two to three times higher than the highest modulating frequency in any channel, and a wide band frequency modulation transmitter coupled to said single circuit and which is frequency modulated by the composite signal in such manner that the transmitted frequency during the time period assigned to each channel is varied through a continuous range of values in proportion to the value of potential in the channel and through a frequency swing of at least plus and minus one megacycle.

3. A frequency modulation time division multiplex communication system comprising a plurality of channels each having signal modulation potentials impressed thereon, a commutator for assigning said channels sequentially and periodically to a single circuit to thereby combine portions of the signals from the different channels into a single composite signal, the time periods assigned to each channel by the commutator being repeated at a rate which is higher than the highest modulating frequency, a wide band frequency modulation transmitter coupled to said single circuit and responsive to the composite signal therein, said wide band frequency modulation transmitter having a frequency deviation upon modulation of at least plus and minus one megacycle, and a receiver remotely located relative to said transmitter, said receiver including a wide band frequency modulation receiving apparatus, a commutator for passing the output of said receiving apparatus, said commutator operating in synchronism with the commutator associated with the transmitter, and a plurality of utilization circuits coupled to the output of said commutator and corresponding in number to the numer of said channels.

4. A frequency modulation time division multiplex communication system comprising a plurality of channels each having signal modulation potentials covering a continuous range of values impressed thereon, an electron discharge device commutator for assigning said channels sequentially and periodically to a single circuit to thereby combine representative portions of the signals from the different channels into a single composite signal having a substantially continuous range of amplitudes, the time periods assigned to each channel by the commutator being repeated at a rate which is higher than the highest modulating frequency, a wide band frequency modulation transmitter coupled to said single circuit and responsive to the continuous range of potentials of the composite signal therein, said transmitter including apparatus for generating a carrier above 10000 megacycles and having a frequency swing upon modulation of at least plus and minus one megacycle, and a wave directive structure coupled to the output of said transmitter.

5. A frequency modulation radio relaying time division multiplex system comprising a plurality of channels each having signal modulation potentials impressed thereon, a commutator for assigning said channels sequentially and periodically to a single circuit to thereby combine portions of the signals from the different channels into a single composite signal, the time periods assigned to each channel by the commutator being repeated at a rate which is higher than the highest modulating frequency, and a wide band frequency modulation transmitter coupled to said single circuit and responsive to the composite signal therein for providing an output whose frequency swing is at least plus and minus one megacycle, said transmitter including apparatus and a directive antenna for radiating a carrier wave whose mean frequency is above 300 megacycles, and a plurality of frequency modulation repeaters each having a directive receiving antenna arranged to receive signals from the immediately preceding station and a directive transmitting antenna arranged to transmit signals to the next succeeding station, and a terminal receiving station having a directive receiving antenna, a wide band frequency modulation receiver coupled to said last antenna, a commutator coupled to the output of said receiver and operating in synchronism with the commutator associated with said transmitter, and a plurality of utilization circuits coupled to the output of said commutator at the receiver and corresponding in number to said channels, as a result of which the original modulation from said channels is substantially reproduced in the output of said receiving commutator.

6. A frequency modulation radio relaying multiplex system as defined in claim 5, characterized in this that said utilization circuits comprise broadcasting transmitter stations.

7. In a time division multiplex communications system, a receiver providing a rectified output, a commutator coupled to the aforesaid output and means positioned between said receiver and said commutator for storing, time delaying, and reintroducing a fraction of the signal energy to balance out interference from one channel occupying one sequence of time periods into another channel occupying another sequence of time periods.

8. A frequency modulation multiplex communication system comprising a plurality of channels each having signal modulation potentials of varying amplitudes covering a continuous range of values impressed thereon, an electron discharge device commutator for assigning said channels sequentially and periodically to a common circuit to thereby combine representative portions of the signals from the different channels into a composite signal having a continuous range of amplitudes and occupying a frequency band greater than the frequency band of the signals in each of said channels, the time periods assigned to each channel by the commutator being repeated at a rate which is higher than the highest modulating frequency, a wide band frequency modulation radio relay system coupled to said common circuit and responsive to the continuous range of potentials of the composite signal therein, said wide band frequency modulation system including a transmitter having a frequency swing upon modulation of at least plus and minus one megacycle.

9. A time division multiplex communication system comprising a plurality of separate input channels each carrying signal potentials and currents, within a band of frequencies, said potentials and currents having a continuous range of amplitudes; a commutator for coupling said channels sequentially and periodically to a single circuit to thereby combine representative portions of the signals from the different channels into a single composite signal having a continuous range of amplitudes and occupying a frequency band greater than the frequency band of the signals in each of the separate channels, the time periods assigned for coupling to each channel by the commutator being repeated at a rate higher than the highest frequency to be utilized in each channel, and a frequency modulation transmitter for modulating a carrier current in response to the composite representative portions of channel currents in the single circuit, said frequency modulation transmitter having a frequency deviation upon modulation of at least plus and minus one megacycle.

10. A time division multiplex communication system comprising a plurality of channels, each having modulation applied thereto, commutating means for assigning said channels to a common output circuit sequentially and periodically, said commutating means providing a composite signal having a continuous range of amplitudes and occupying a frequency band greater than the frequency band of the signals in each of the separate channels, said multiplex system including a transmitter terminal station having a wide band frequency modulation transmitter coupled to said common output circuit and providing an output whose frequency swing is at least plus and minus one megacycle, in combination with a frequency modulation radio relaying system comprising directional transmitting and receiving terminals and a series of intermediate directional repeater stations located between said terminals.

11. A frequency modulation time division multiplex communication system comprising a plurality of channels each having signal modulation potentials impressed thereon, a commutator for assigning said channels sequentially and periodically to a single circuit to thereby combine portions of the signals from the different channels into a single composite signal, the time periods assigned to each channel by the commutator being repeated at a rate which is higher than the highest modulating frequency, a wide band frequency modulation transmitter coupled to said single circuit and responsive to the composite signal therein, said wide band frequency modulation transmitter having a frequency deviation upon modulation of at least plus and minus one megacycle, and a receiver remotely located relative to said transmitter, said receiver including a wide band frequency modulation receiving apparatus, a commutator for passing the output of said receiving apparatus, said commutator operating in synchronism with the commutator associated with the transmitter, and a plurality of utilization circuits coupled to the output of said commutator and corresponding in number to the number of said channels.

12. A frequency modulation time division multiplex communication system having a plurality of channels over which communication is effected, said system including a wide band frequency modulation receiver having coupled to its input a wave directive structure for collecting frequency modulated waves transmitted from a remote point, and a time division commutator coupled to the output of said receiver for passing portions of said output sequentially and periodically to a plurality of utilization circuits corresponding in number to the number of channels of said system, and means also coupled to the output of said receiver and to the input of said commutator for storing, time delaying and reintroducing a fraction of the signal energy from one channel occupying one sequence of time periods into another channel occupying another sequence of time periods to balance out interference.

13. A frequency modulation time division multiplex communication system comprising a plurality of channels each having impressed thereon signal potentials which fluctuate through a continuous range of amplitude values, a commutator for assigning said channels sequentially and periodically to a single circuit to thereby combine portions of the signals from the different channels into a single composite signal, the time periods assigned to each channel by the commutator being repeated at a rate which is higher than highest modulating frequency in the channel, and a wide band frequency modulation transmitter coupled to said single circuit and being frequency modulated by the composite signal in such manner that the transmitted frequency during the time period assigned to each channel is varied through a continuous range of values in proportion to the value of potential in the channel, said wide band frequency modulation transmitter producing a carrier current of a frequency substantially equal to 300 megacycles or higher and an output having a total peak frequency swing of 10 megacycles.

14. In a time division multiplex communications system having a plurality of channel circuits, a receiver providing a substantially rectangular waveform output which is signal modulated in amplitude, said receiver being coupled to said channel circuits, a commutator, a coupling between said receiver and said commutator for supplying said commutator with said aforesaid output, and means connected to said coupling for storing, time delaying and reintroducing a fraction of the signal energy from one channel circuit occupying one sequency of time periods into another channel circuit occupying another sequency of time periods to balance out interference.

CLARENCE W. HANSELL.

REFERENCES CITED

The following references are of record in the file of this patent:

UNITED STATES PATENTS

| Number | Name | Date |
|---|---|---|
| 1,802,745 | Whitaker | Apr. 28, 1931 |
| 2,155,821 | Goldsmith | Apr. 25, 1939 |
| 2,227,108 | Roosenstein | Dec. 31, 1940 |
| 2,250,950 | Goldsmith | July 29, 1941 |
| 2,262,838 | Deloraine et al. | Nov. 18, 1941 |
| 2,266,194 | Guanella | Dec. 16, 1941 |
| 2,273,193 | Heising | Feb. 17, 1942 |
| 2,275,486 | Armstrong | Mar. 10, 1942 |
| 2,276,008 | Armstrong | Mar. 10, 1942 |
| 2,310,692 | Hansell | Feb. 9, 1943 |
| 2,380,982 | Mitchell | Aug. 7, 1945 |
| 2,397,913 | Bernstein | Apr. 9, 1946 |

FOREIGN PATENTS

| Number | Country | Date |
|---|---|---|
| 289,102 | Great Britain | Apr. 23, 1928 |
| 644,217 | France | June 4, 1928 |

OTHER REFERENCES

IRE, "A Method of Reducing Disturbances in Radio Signaling by a System of Frequency Modulation" by E. H. Armstrong, vol. 24, No 5, May 1936, pages 689–740.

IRE, "Time-Division Multiplex in Radiotelegraphic Practice," by Callahan, Mathes and Kahn, vol. 26, No. 1, January 1938, pages 55–75.